United States Patent [19]

Gordon et al.

[11] 3,715,505

[45] Feb. 6, 1973

[54] TIME-DIVISION SWITCH PROVIDING TIME AND SPACE SWITCHING

[75] Inventors: Travis Hill Gordon, New Shrewsbury; Patrick John Marino, Middletown; Randolph John Pilc, Holmdel, all of N.J.

[73] Assignee: Bell Telephone Laboratories, Incorporated, Murray Hill, N.J.

[22] Filed: March 29, 1971

[21] Appl. No.: 128,767

[52] U.S. Cl. ..........................179/15 AQ, 179/18 GF

[51] Int. Cl. ..........................................H04q 11/04

[58] Field of Search......179/15 AQ, 15 AT, 18 FC, 18 GF

[56] References Cited

UNITED STATES PATENTS

| | | | |
|---|---|---|---|
| 3,597,548 | 8/1971 | Drinnan | 179/15 AT |
| 3,458,659 | 7/1969 | Sternung | 179/15 AQ |
| 3,585,306 | 6/1971 | Battocletti | 169/15 AQ |
| 3,522,381 | 7/1970 | Feder | 179/15 A |

FOREIGN PATENTS OR APPLICATIONS

| | | | |
|---|---|---|---|
| 1,181,913 | 2/1970 | Great Britain | 179/15 AQ |
| 41/6376 | 4/1966 | Japan | 179/15 AQ |

*Primary Examiner*—Kathleen H. Claffy
*Assistant Examiner*—David L. Stewart
*Attorney*—R. J. Gunether and Kenneth B. Hamlin

[57] ABSTRACT

Incoming data channels on time-division lines are interconnected with any channels on outgoing time-division lines, the lines accommodating serial multibit bytes during individual time slots. All incoming bytes from the several lines are applied to a common data bus to create a superframe, the data bus having a plurality of parallel leads to carry the bits of the byte. Address data, applied to a common address bus by a processor, steers each byte from the data bus to a selected one of a plurality of registers, each register being dedicated to an outgoing channel. Each outgoing line then sequentially reads out the stored data from the registers dedicated to the outgoing channels accommodated by the outgoing line.

5 Claims, 3 Drawing Figures

INVENTORS T. H. GORDON
P. J. MARINO
R. J. PILC

BY [signature]

ATTORNEY

TIME-DIVISION SWITCH PROVIDING TIME AND SPACE SWITCHING

FIELD OF THE INVENTION

This invention relates to switching systems for interconnecting data channels carried by time-division multiplex lines and, more particularly, to time-division switches capable of providing both time (slot interchange) and space switching.

DESCRIPTION OF THE PRIOR ART

In known forms of communication systems, common transmission paths accommodate a plurality of signaling channels on a time-division multiplex basis. In these systems, each channel is assigned a time slot in a cycle or frame which is regularly repeated. Each time slot provides an interval during which the transmission path carries data which defines a sample or samples of the message signal from the channel source.

Switching systems for interconnecting channels on various common transmission paths must have the capability of interconnecting an incoming channel in any time slot on any one path with an outgoing channel in any time slot on any other path. More specifically, the switch must provide both time switching (time slot interchange) and space switching (line interconnection). The time switching interchanges the data in time from the time slot assigned to the incoming channel to the time slot assigned to the outgoing channel. The space switching transfers the data from the incoming transmission path to the outgoing path.

When large pluralities of lines are interconnected, it is desirable, from an economic point of view, to employ a common switch. To this end, a preferred system organization is arranged to multiplex all the channels from all the incoming transmission paths onto a common data bus to create a superframe of data wherein each time slot in the superframe is assigned to a specific incoming channel on any one of the incoming paths. A time-division switch then provides the appropriate time and space switching to distribute the data from each time slot on the data bus to the desired time slot on the desired outgoing path.

In modern switching practices, the switch is divided into two portions; namely, the actual switch structure or organization which interchanges the data and interconnects the channels and the processor which develops address data that controls the operations of the switch. Since controls are removed from the switch structure, and, further, since the first switch function is to be performed at the single specific location of the common data bus, the time-division switch has the advantage of relative simplicity in design and implementation and, as pointed out above, is economical in cost. Moreover, the address processor function is simplified since each time slot identifies the incoming channel and, of course, since control for the first switching functions is to be provided at a single physical point. These advantages, however, are substantially lost after the first switching operation, whether the time or space switching, since subsequent operations will not be provided at the single specific location of the common data bus or at a pre-identified time.

It is therefore an object of this invention to provide an improved time-division switch. More specifically, it is an object of this invention to provide a switch organization wherein time and space switching is accomplished at a single physical point and at a pre-identified time, thereby retaining the various advantages of a time-division switch.

SUMMARY OF THE INVENTION

In accordance with the objects of this invention, each outgoing channel (and thus each time slot on each outgoing transmission path) has dedicated thereto a register having storage capacity to register data carried by a time slot. A single switch operation (under control of the address processor) transfers data from each time slot on the common data bus to the register corresponding to the outgoing channel destination. Each outgoing transmission path then sequentially reads out the data in the registers corresponding to the outgoing channels accommodated by the path. Accordingly, the time and space switch function occurs at the physical location of the common bus at the pre-identified time coincident in time with the time slot assigned to the incoming channel.

It is a feature of this invention that the switch organization is arranged to transfer data from each time slot on the data bus to a register defined by an address code which appears on a common address bus during a time slot coincident in time with the data bus time slot assigned to the incoming channel. The address code is therefore assigned to the incoming channel and defines the outgoing channel destination (and thus defines a specific time slot on a specific outgoing path). All processor output information is therefore utilized at a single physical point and at a pre-identified time to simplify the processing function.

In accordance with the specific embodiment disclosed herein, the incoming and outgoing channel signaling is organized into multibit bytes, the bits of each byte being serially accommodated by the time slot, on the transmission path, assigned to the channel. The common data bus is provided with a plurality of parallel leads equal in number to the number of bits in a byte in order to carry the data byte within the appropriate data bus time slot. Each register includes a plurality of bit stores for simultaneously registering the parallel bits in the byte when they are transferred from the data bus by the switch operation. When the registered data is read out to the outgoing path, the stored bits in each register are sequentially applied to the path to thereby transfer serial-bit bytes to the outgoing channel.

The foregoing and other objects and features of this invention will be more fully understood from the following description of an illustrative embodiment thereof taken in conjunction with the accompanying drawings.

DETAILED DESCRIPTION

Figure 1:
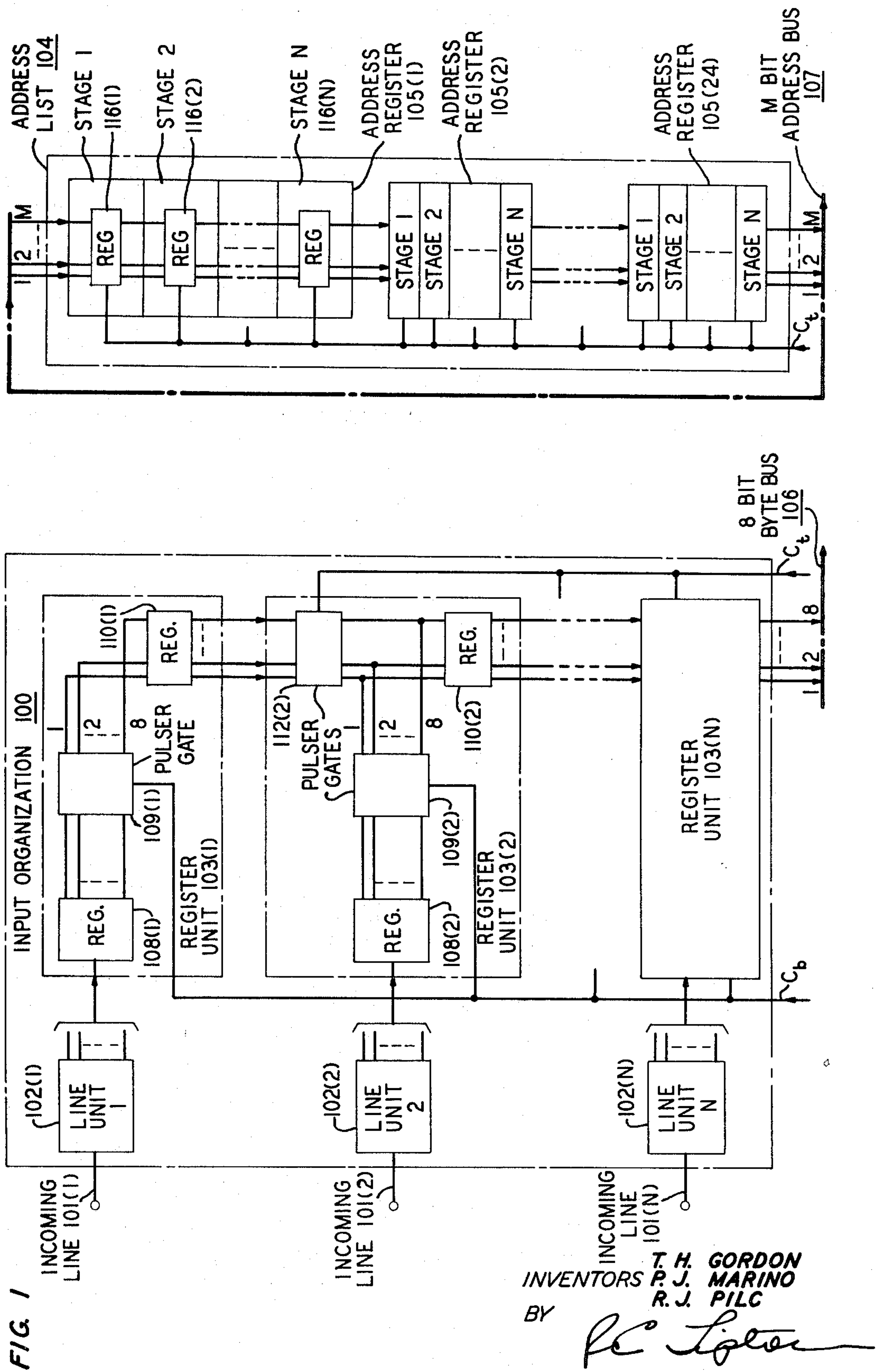
FIG. 1 shows, in schematic form, the input organization of a specific embodiment of a switch in accordance with the invention, together with a simple form of a processor suitable for use with the switch organization.
Figure 2:
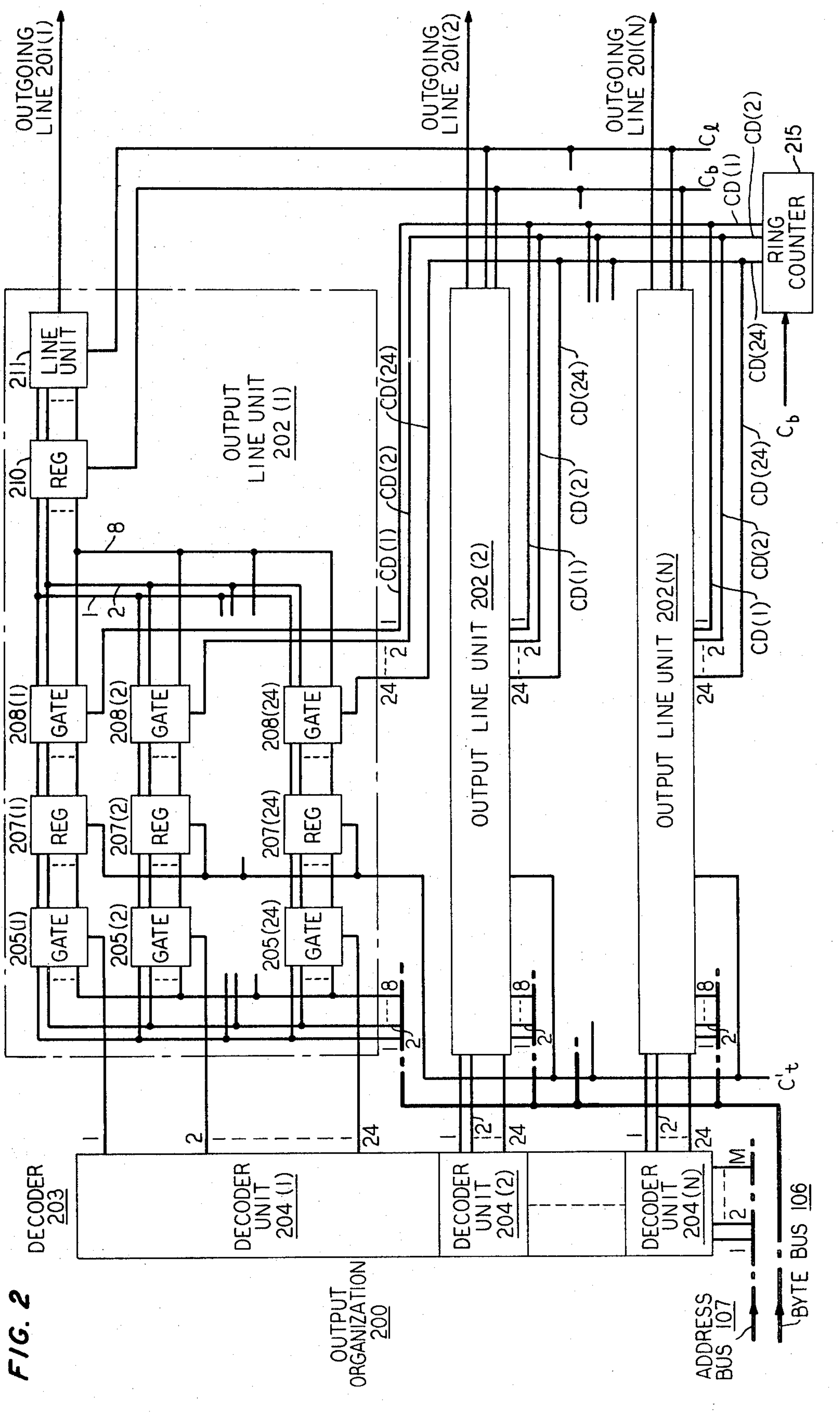
FIG. 2 shows, in schematic form, the output organization of a specific embodiment of a switch and the manner it cooperates with the processor, in accordance with the invention.

The time-division switch, as shown in FIG. 1 and FIG. 2, may be considered as divided into three general portions; namely, input organization 100, address list 104, shown in FIG. 1, and output organization 200, shown in FIG. 2.

In FIG. 1 there is shown a plurality of incoming lines, N in number. The lines, identified as incoming lines 101(1) through 101(N), are shown connected to input organization 100. In the specific embodiment described herein there are provided an identical number of outgoing lines, identified in FIG. 2 as outgoing lines 201(1) through 201(N). Each incoming line is arranged to be a data trunk accommodating a plurality of data channels on a time-division basis. For the purposes of this description, each incoming line accommodates 24 data channels.

The specific type of signaling for each data channel comprises serial data bits which are organized in groups of eight-bits, each group hereinafter called a "byte." An incoming serial data stream is received over each incoming line, each data stream comprising sequential frames of data, each line frame of data comprising twenty-four bytes sequentially derived from the twenty-four channels. Accordingly, a frame of data from any incoming line comprises a serial train of 24 eight-bit bytes.

Each of the outgoing lines accommodates substantially the same data stream organization as an incoming line, that is, each outgoing line is a time-division data trunk accommodating 24 channels and therefore carrying a line frame of 24 eight-bit bytes. The time-division switch transfers data from the channels on the incoming lines to channels on the outgoing lines. As described hereinafter, the switch provides both time and space switching, that is, it has the capability of transferring data from any channel on any incoming line to any channel on any outgoing line.

In the present arrangement the line speeds of the incoming and outgoing lines are substantially identical. Since the data formats of the lines are the same, the durations of the bits, of the bytes, and of the frames on all of the lines are correspondingly the same. Therefore, during any interval corresponding to the duration of a frame, the number of incoming bytes on any individual incoming line is 24 bytes. Since we have fixed the number of incoming lines at N, the total number of incoming bytes from all lines for any frame interval is 24N bytes. During the same frame interval the time-division switch passes to each of the outgoing lines the same number of bytes as the switch receives from any incoming line; namely, twenty-four bytes.

Input organization 100 accepts the serial data from each incoming line and assembles them in a byte format. More specifically, the eight bits of each incoming byte are assembled in parallel. These eight parallel-bit bytes are then placed on a shift register arrangement and the bits of each byte are passed out in parallel to eight-bit byte bus 106. A byte from each of the N incoming lines is therefore applied, interleaved with other bytes, to byte bus 106. Byte bus 106 therefore has impressed thereon N interleaved bytes, creating N time slots, the duration of the N time slots being equal to or less than the duration of time required by any line to receive the eight bits of one byte.

This process is repeated for each successive incoming byte interval until the bytes from all the channels on all the lines have been received, assembled and applied, in interleaved fashion, to the byte bus. The information on byte bus 106, therefore, comprises a superframe of data which includes the frames of data from all of the incoming lines.

Since we have assumed that each line is carrying 24 channels, the superframe of data therefore consists of 24N time slots. Recalling that interleaved bytes are received from all the lines during an incoming byte interval, it can be said that one time slot during each byte interval is assigned to each incoming line. Each incoming line therefore has assigned thereto 24 time slots during each superframe. Since each line accommodates the same number of channels; namely, 24, the data from each channel is received every 24th byte interval. Thus, it can further be said that during any byte interval, the time slot assigned to the line is dedicated to a specific data channel. Accordingly, identification of any time slot also identifies the specific data channel from whence the byte, occupying the time slot on the bus, was received.

Byte bus 106 extends to output organization 200. As described hereinafter, output organization 200 has the capability of assembling and storing a frame of data for each of the outgoing lines and, therefore, in total, output organization 200 can store one entire superframe of information derived from byte bus 106. Output organization 200, after storing the data, sequentially reads out each line frame of information to the corresponding outgoing line.

The manner in which output organization 200 stores the various frames of information is controlled by decoder 203. Decoder 203, in turn, determines the manner of storage in accordance with information received over address bus 107.

Information on address bus 107 is provided by address list 104. Address list 104 is organized to apply an M parallel-bit data word to address bus 107 during each time slot that a byte is applied to byte bus 106 by input organization 100. The M bits on address bus 107 comprise an address word which defines a specific outgoing channel on a specific outgoing line. Since each address word appears on address bus 107 in a time slot which coincides in time with the time slot that a byte appears on bus 106, the address word is dedicated to (and is therefore used by) the incoming channel from whence the byte is provided. Summarizing, each address word is dedicated to an incoming channel; is therefore applied to address bus 107 at the same time a byte derived from the incoming channel is applied to byte bus 106; and, further, defines the outgoing channel to which the byte is to be transferred.

Summarizing the operation of the time-division switch, incoming bytes from data channels on the several incoming time-division lines are assembled, in parallel, by input organization 100 and passed to byte bus 106 in time slots dedicated to the data channels. As each byte appears on byte bus 106, a corresponding address word (also dedicated to the incoming channel) is applied to address bus 107 by address list 104. The address word, which defines the outgoing channel, is then passed to decoder 203, while the byte is applied to output organization 200. Output organization 200, which has the capability of storing a frame of data for each outgoing line, is controlled by decoder 203 to place the incoming byte in an appropriate storage position, which storage position defines the desired outgoing channel of the desired outgoing line. Output organization 200 then sequentially reads out the various stores and applies them to the outgoing lines.

Returning now to input organization 100, it is seen that incoming lines 101(1) through 101(N) extend to line units 102(1) through 102(N), respectively. The outputs of line units 102(1) through 102(N) extend to register units 103(1) through 103(N), respectively.

The line units are substantially identical and function to accept the incoming serial bit train, assemble the various bits into bytes and pass the bits of each byte, in parallel, to the corresponding register unit. A suitable word or byte assembler of this type is disclosed in U.S. Pat. No. 3,160,876, which issued to N. H. Stochel on Dec. 8, 1964.

The various register units are substantially identical, with minor exceptions noted below. Considering register unit 103(2), it is seen that the parallel-bit byte output of line unit 102(2) is passed to register 108(2). Register 108(2) constitutes a multibit register having a sufficient number of stages to store the eight bits of a byte. Register 108(2), in turn, applies the bits of the byte in parallel to pulser gate 109(2).

The output of pulser gate 109(2) is connected to the input of register 110(2). Upon the application of a clock pulse, identified as clock pulse $C_b$, gate 109(2) inserts the various bits applied thereto by register 108(2) into register 110(2). Register 110(2) constitutes one stage of a shift register which functions to pass the bytes to byte bus 106, as described in more detail hereinafter.

Summarizing the operation of line unit 102(2), together with line unit 103(2), the incoming serial data from each channel is assembled into a byte and the bits therein are stored in register 110(2), which register constitutes a stage of a shift register. As described in detail hereinafter, clock pulse $C_b$, which inserts the bits in register 110(2), occurs once per each byte duration. Accordingly, when the next byte from the next data channel is received by line unit 102(2), the process is repeated and this new byte is inserted in register 110(2) in the same manner as previously described.

Concurrently with the above-described operations of register unit 103(2), each of the other register units accepts an incoming byte from its corresponding line unit and inserts the byte into a register corresponding to register 110(2). Thus, upon the application of clock pulse $C_b$ all registers corresponding to register 110(2) have bytes stored therein in preparation to be shifted out to byte bus 106.

Register unit 103(2) also has included therein pulser gate 112(2). The input of gate 112(2) extends to the output of register 110(1), which is the register in register unit 103(1) that corresponds to register 110(2). The output of register 110(2) similarly extends to a 112 pulser gate in the next subsequent register unit. The output of the corresponding 110 register (not shown) in register unit 103(N) is passed to eight-bit byte bus 106. Each of the pulser gates, such as gate 112(2), is pulsed by clock pulse $C_t$. Upon the application of this clock pulse, the output of register 110(1) is inserted into register 110(2). At the same time, of course, the 112 pulser gate in the next subsequent register passes the output of register 110(2) to the next subsequent register corresponding to register 110(2). Therefore, the various registers 110 and gates 112 operate as a shift register to pass all the bytes through all the register units and then on to byte bus 106. As described in detail hereinafter, clock pulse $C_t$ occurs a sufficient number of times between each clock pulse $C_b$ to shift all the bytes stored in the various registers of the shift register to eight-bit byte bus 106. Accordingly, the 110 registers are cleared out prior to the application of the next $C_b$ pulse and the consequent insertion of the new byte in the 110 registers.

The output of byte bus 106 extends to the output organization 200, as previously noted. More specifically, byte bus 106 extends in parallel to output line units 202(1) through 202(N). Each output line unit is arranged and operates in substantially the same manner.

Considering output line unit 202(1), the various leads on byte bus 106 are applied in parallel to 24 gates, namely gates 205(1) through 205(24). Another input to gates 205(1) through 205(24) extends to decoder unit 204(1) in decoder 203. As previously indicated, decoder 203 operates to select the particular storage position in a particular output line unit. This is provided by the above-mentioned decoder leads extending to gates 205(1) through 205(24). Assume that, during a time slot interval, the input lead to gate 205(1) is selected by decoder 203. The gate is enabled to pass the parallel-bit byte that is on byte bus 106 during this time slot interval and apply the byte to register 207(1). The byte is then inserted into the register by the application of clock pulse $C_t'$, that is, clock pulse $C_t$ inverted. Accordingly, during each time slot on byte bus 106, decoder 203, under control of the address word, inserts the parallel bits of the byte into a register, such as register 207(1), in one of the output line units.

It has been indicated that output line 202(1) has twenty-four registers therein. The total number of registers, such as register 207(1), in all of the output line units is thus 24N. This corresponds to the 24N time slots on byte bus 106. The 202 output line units can thus store all of the bytes in a superframe.

The outputs of registers 207(1) through 207(24) are applied to gates 208(1) through 208(24), respectively. Gates 208(1) through 208(24) are sequentially enabled by sequential channel timing pulses on leads CD(1) through CD(24). These timing pulses are derived from ring counter 215 which is driven by clock pulse $C_b$. As described hereinafter, the pulses on leads CD(1) through CD(24) occur in succession and in a manner to sequentially enable gates 208(1) through 208(24) during a superframe interval or during the corresponding line frame interval. The consequent result is to sequentially apply those parallel-bit bytes stored by the 207 registers to common register 210.

The eight-bit byte applied to register 210 is inserted therein by clock pulse $C_b$. The byte stored therein is then converted to a serial-bit train by line unit 211, which may comprise a conventional parallel-to-serial converter. The outpulsing of line unit 211 is under control of line bit clock pulse $C_b$. The output of line unit 211 is then passed to outgoing line 201(1). A line frame is thus created on outgoing line 201(1) which constitutes a sequence of 24 eight-bit bytes, each byte appearing on the line in a position corresponding to the position dedicated to the 24 channels on outgoing time-division line 201(1).

As previously indicated, the information on address bus 107 is provided by address list 104. It is recalled that each superframe of parallel-bit bytes on byte bus 106 consists of 24N time slots. The identification of any slot also identifies the specific data channel from whence the byte occupying the slot on the byte bus was received. Address list 104 applies to address bus 107 an address word during each time slot. This word is dedicated to the data channel whose byte is occupying the byte bus at this time. This word also defines the address for the byte, which address comprises a specific outgoing channel on a specific outgoing line. Since there are 24N outgoing channels, the number of bits in the address word must be sufficient to identify all of the channels. Accordingly, an M-bit word is applied to address bus 107 where $$2^M \geqq 24N.$$

Address list 104 is arranged in the form of a recirculating shift register. The register is formed into twenty-four portions; namely, address registers 105(1) through 105(24), each register portion being arranged in substantially the same manner.

Examining address register 105(1), it is seen that there is included N stages, each stage having a word register therein; namely, word registers 116(1) through 116(N). Each word register has the capability of storing M parallel bits therein and, therefore, stores the several bits of an address word.

In address register 105(1) it is seen that the input to word register 116(1) is derived from address bus 107. The information is applied to address bus 107 by the word register in address register 105(24), which corresponds to word register 116(N). The output of address register 105(24) is recycled and inserted into register 116(1) by clock pulse $C_t$. The output of word register 116(1) is applied to word register 116(2), which output is inserted in word register 116(2) by clock pulse $C_t$. The output of word register 116(2) is, in turn, passed on to the next successive word register, to be inserted in that register by clock pulse $C_t$. The address word is therefore shifted down from word register to word register by a shift pulse derived from clock pulse $C_t$, passing through each word register in turn and then through each 105 address register in turn until it is applied to address bus 107.

Examining the overall organization of address list 104, it is seen that the word stored in the word register in address register 105(24), which corresponds to register 116(N), is applied to address bus 107 during the first time slot of the superframe. This address word is therefore dedicated to the first data channel on incoming line 101(N), since this first channel will occupy the first time slot in the superframe on byte bus 106. It can thus be seen that each of the succeeding word registers down through the word register in STAGE 1 of address register 105(24) is initially storing address words dedicated to the first channel on the successive incoming lines down to incoming line 101(1). Similarly, subsequent address registers, down to address register 105(1), store the various address words for subsequent incoming channels on the several incoming lines. Consequently, each word register in the address list can be identified and therefore dedicated to any of the incoming channels.

Initially, an address word is stored in each of the word registers. The manner by which this storage is accomplished is not shown but may comprise any conventional external processing, including manually inserting the desired address words in the word registers or utilizing data processors to provide the same insertion function in response to any conventional algorithm. The only necessary criteria is that each address word stored therein defines the outgoing channel destination for the data from the incoming channel corresponding to the particular address word register.

Summarizing the operation of address list 104, the list is organized as a recirculating shift register having 24N word registers. In the initial condition, each register corresponds to an incoming channel and has a word stored therein defining the outgoing channel destination for the data on the incoming channel. The address list passes the address words to the address bus in a manner wherein each word appears on the bus in the time slot dedicated to the corresponding incoming channel. The address words appearing on the address bus are then recirculated so that their appearances on address bus 107 are repeated for each superframe so long as the external source does not modify the word storage of address list 104.

As previously noted, the address words on address bus 107 are passed to decoder 203. Decoder 203 generally comprises a plurality of decoder units; namely, decoder units 204(1) through 204(N). Each unit has 24 outputs. The outputs pass to a correspondingly numbered one of output line units 202(1) through 202(N). For example, the 24 outputs of decoder unit 204(1) pass to output line unit 202(1). As previously noted, the decoder unit outputs operate to enable the various 205 gates in the output line unit.

Each of the N decoder units advantageously comprises a static circuit translator having 24 portions. Each one of the 24N portions operates to energize its corresponding output lead when a predetermined M-bit address word is applied thereto.

In the present arrangement we have noted that the data from one of 24N incoming channels is passed to one of 24N outgoing channels. In addition, there are provided at least 24N different permutations of address words. Accordingly, the 24N different translator portions in decoder 203 operate on the corresponding 24N address words to energize selected ones of the 24N output leads of decoder 203 to thereby enable corresponding 205 gates and thus pass the data on the data bus to the appropriate outgoing channel as previously described. It is, of course, apparent that the output organization may optionally be arranged whereby one address word could effect the energization of two or more of the 205 gates. This would permit (by hardware modification) the broadcasting of a message to two or more output channels.

Figure 3:
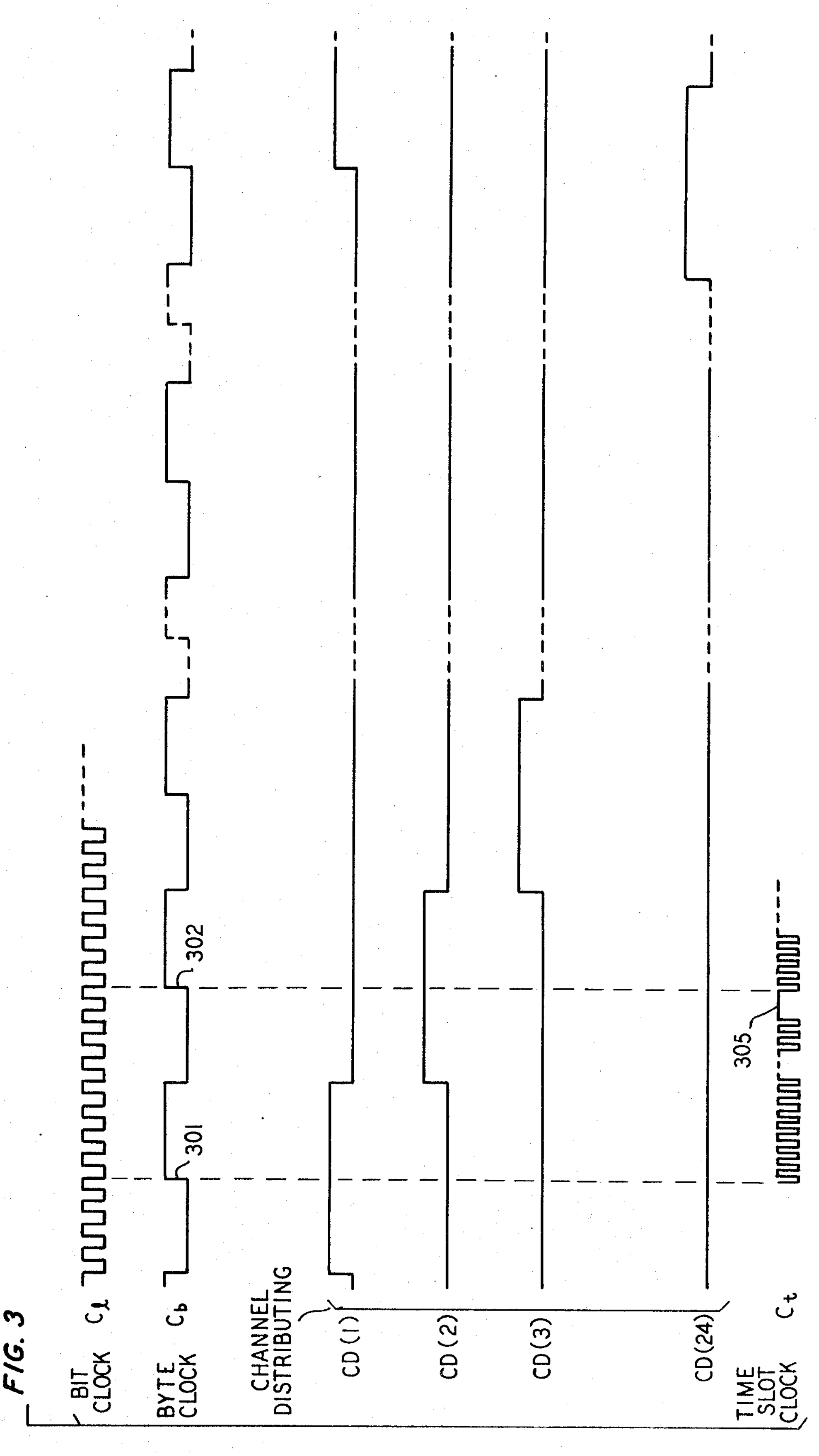
FIG. 3 discloses various timing waveforms of clock pulses which are used for timing the various operations of the switch.

The various clock pulses used for assembling, gating, disassembling, etc. have previously been generally discussed. The timing waves of these clock pulses are shown in FIG. 3.

It is recalled that byte clock pulse $C_b$pulses gates 109 to insert the incoming byte into the 110 registers in input organization 100. The operation of the 109 pulser gates occurs at the leading edge of clock pulse $C_b$. This leading edge is identified by positive transitions 301 and 302, for example, as seen in FIG. 3.

After the bytes are inserted in the 110 registers, they are shifted down into byte bus 106. The shifting is accomplished by time slot clock pulse $C_t$. Referring to FIG. 3, it is seen that a plurality of the $C_t$clock pulses occur between each leading edge or positive transition of clock pulse $C_b$; this plurality of clock pulses $C_t$ being fixed at N pulses. As seen in FIG. 3, the leading edge (or positive transition) of the first clock pulse of wave $C_t$ occurs after the positive transition of clock pulse $C_b$. This positive transition of clock pulse $C_t$ shifts the byte in register unit 103(N) to byte bus 106 and the address word in stage N of address register 105(24) to address bus 107. All of the bytes stored, in the register units 103(1) to 103(N), during the first byte interval, and all of the corresponding address words, stored in address register 105(24), are then shifted on to the byte bus and the address bus prior to the next positive transition of clock pulse $C_b$. After the final byte and address word are thus shifted a pause occurs, as defined by pause interval 305 in the clock pulse $C_t$ timing wave. This interval permits the new incoming bytes from the next data channels to be inserted in the various 103 register units. Thereafter the process is repeated, the new bytes and the next group of N address words being applied to the data and address buses.

The interleaved bytes on byte bus 106 are now applied to selected ones of the several 207 registers in the 202 output line units by the 205 gates. Clock pulse $C_t'$ inserts these bytes into the 207 registers. Since clock pulse $C_t'$ (whose wave is not shown) is clock pulse $C_t$ inverted, it is apparent that the leading edges of clock pulse $C_t$ and consequent insertions into registers 207 occur at the approximate midpoints of the time slots. This eliminates any conflict between the operation of the 205 gates and the insertion of the bytes into the 207 registers.

The bytes in the 207 registers, as previously described, are then sequentially applied to the 210 registers by the 208 gates under control of the channel timing and distributing waves CD(1) through CD(24). As seen in FIG. 3, each wave, such as wave CD(1), has a positive pulse equal in duration to one cycle of clock pulse $C_b$. The 208 gate applies the byte to the 210 register during this pulse interval. The byte is now inserted into the 210 register by the leading edge of clock pulse $C_b$. It is to be noted that this leading edge occurs at the midpoint of the CD(1) through CD(24) timing waves.

The byte in register 210 is finally read out and applied to the outgoing line by the 211 line unit under control of byte clock pulses $C_t$. Referring to FIG. 3, it is seen that eight of the $C_t$clock pulses occur between each positive transition of byte clock pulse $C_b$. Accordingly, the 211 line unit reads out the eight bits of the complete byte during each byte interval and prior to the insertion of the next byte into the 210 register.

The present arrangement has been described as accepting incoming data from incoming lines 101(1) through 101(N) and passing them out to outgoing lines 201(1) through 201(N). It is apparent that this process can be reversed by relatively simple modification whereby incoming data can be accepted from lines 201(1) through 201(N) and passed out through lines 101(1) through 101(N). These simple modifications would include the changes described below.

The 201 line units are modified to operate in the manner previously described for the 102 line units. This permits distributing the sequential bytes incoming on line 201 to the 205 gates. Ring counter 215, in this case, could provide the timing waves for this distribution, placing the bytes of all channels on the 207 registers for each incoming frame.

Decoder 203 could selectively enable appropriate ones of the 205 gates to selectively pass the bytes in the 207 registers to byte bus 106. Address list 104 would not have to be modified. Each stage therein would still be dedicated to a 101 line (now outgoing) and each address word would define a 201 line. The bytes on bus 106 (derived from the 207 registers) are therefore sequentially arranged in time slots dedicated to the several 101 lines. Thus, bytes are then passed up through the 110 registers (in the reverse direction through appropriate modifications). When all of the bytes in a byte interval are shifted through the 110 registers, the 103 register unit would be enabled by the byte clock pulse $C_b$ to pass the bytes to the 108 registers and thence out to the 102 line units, which would be modified to operate in the same manner as the 211 line units operate when the 201 lines are outgoing. An advantage of this dual arrangement is that during any superframe an address word may be used more than once. Thus, without any hardware modification, incoming signals from any one channel may be passed to two or more outgoing channels.

Although a specific embodiment of this invention has been shown and described, it will be understood that various modifications may be made without departing from the spirit of this invention.

We claim:

1. A time-division switch for distributing multiplexed data derived from a plurality of incoming channels to outgoing lines, each line accommodating a plurality of outgoing channels in a time-division sequence, the incoming channels being carried by a common data bus, each of the incoming channels occupying the data bus during a time slot individually assigned thereto, the time-division switch comprising:

a plurality of registers associated with each of the outgoing lines, each of the registers being dedicated to one of the outgoing channels, a source for providing address signals coincident in time with the time slots assigned to the incoming channels, each of the address signals defining one of the outgoing channels, means responsive to each of the address signals for selecting the register dedicated to the outgoing channel defined by the address signal and for transferring the data from the data bus to the selected register during the time slot coincident in time with the address signal, and means for reading out the data from each register to the outgoing channel dedicated thereto during the intervals in the time-division sequence in which the associated line accommodates the outgoing channel.

2. A time-division switch in accordance with claim 1, wherein the plurality of incoming channels are carried by incoming lines on a time-division basis, and means for accepting the data from the incoming channels and assembling and applying the data, interleaved, to the data bus.

3. A time-division switch in accordance with claim 2, wherein the source of address signals includes a common address bus coupled to the responsive means for carrying the address signals.

4. A time-division switch in accordance with claim 3, wherein the data in each channel is organized into multibit bytes, the data bus comprises a plurality of leads corresponding in number to the number of bits in the bytes to carry a parallel-bit byte during each time slot and each of the registers has a plurality of parallel-bit stores corresponding in number to the number of data bus leads to store a parallel-bit byte.

5. A time-division switch, in accordance with claim 4, wherein the reading out means includes means for sequentially reading out the parallel-bit stores in each of the registers during each of the outgoing channel intervals to thereby transfer serial-bit bytes to the outgoing line.

* * * * *